United States Patent [19]

D'Addario

[11] Patent Number: 5,397,407
[45] Date of Patent: Mar. 14, 1995

[54] APPARATUS FOR COOLING ULTRASONIC TUBE SEALERS

[75] Inventor: James D'Addario, Old Westbury, N.Y.

[73] Assignee: Innovative Automation Inc., East Farmingdale, N.Y.

[21] Appl. No.: 180,235

[22] Filed: Jan. 12, 1994

[51] Int. Cl.⁶ .............................. B32B 31/16
[52] U.S. Cl. .......................... 156/73.1; 156/498; 156/580.1; 264/23; 425/174.2; 228/1.1; 228/110.1
[58] Field of Search ............... 156/73.1, 498, 580.1; 264/23; 425/174.2; 228/1.1, 110.1

[56] References Cited

U.S. PATENT DOCUMENTS

| | | | |
|---|---|---|---|
| 2,958,346 | 11/1960 | Kerr | 141/141 |
| 3,529,660 | 9/1970 | Obeda | 228/1.1 X |
| 3,825,043 | 7/1974 | Fechheimer | 141/147 |
| 4,364,783 | 12/1982 | Theodore et al. | 156/69 |
| 4,426,244 | 1/1984 | Wang | 156/498 |
| 4,790,372 | 12/1988 | Gemeinhardt et al. | 165/173 |
| 4,859,276 | 8/1989 | John, Jr. et al. | 156/626 |
| 4,911,778 | 3/1990 | Barnoach | 156/466 |
| 4,954,191 | 9/1990 | Delespaul et al. | 156/69 |
| 5,209,044 | 5/1993 | D'Addario et al. | 53/469 |
| 5,318,420 | 6/1994 | Blaimschein | 425/174.2 |

Primary Examiner—Michael W. Ball
Assistant Examiner—J. Sells
Attorney, Agent, or Firm—Hedman Gibson & Costigan

[57] ABSTRACT

A conventional ultrasonic tube sealing device is modified for dissipating undesirable heat energy by locating in close proximity to a horn a heat sink block, causing via pneumatic means the heat exchange block to make contact with the horn only when the horn is in an open retracted position with respect to an anvil, and causing the heat exchange block to separate from the horn when the horn is in a closed sealing position with respect to the anvil. The heat exchange block cools the heat exchange block by drawing off undesirable heat energy, yet, by separating during the sealing mode, allows the horn to function properly and does not adversely affect its ultrasonic properties. The heat exchange block may be cooled by transporting through strategically located passageways an externally cooled fluid.

14 Claims, 3 Drawing Sheets

5,397,407

APPARATUS FOR COOLING ULTRASONIC TUBE SEALERS

FIELD OF THE INVENTION

The present invention relates to a method and apparatus to provide a heat sink in order to cool devices which use ultrasonic energy for sealing tubes containing cosmetics and the like.

BACKGROUND OF THE INVENTION

It has long been customary to merchandise many products in tubes. Typical products packaged in tubes include toothpaste, lotion, caulking compound, etc. Currently, tube filling is generally performed by automated machinery. Rotary piston tube filling machines are probably the most common machinery now in use for filling tubes. Typical examples of rotary piston tube filling machines are shown in U.S. Pat. No. 2,958,346 and U.S. Pat. No. 3,825,043. Additionally, such machines are currently manufactured by Norden Packaging Machinery AB, Kalix Inc., Iwk Packaging Machinery, Inc. Pack. Dev. Co. Ltd. and Aktron, Inc.

A tube filling and sealing station made by the assignee of the present application, Innovation Automation Inc., is described in U.S. Pat. No. 5,209,044 to D'Addario et al., which is incorporated herein by reference. The apparatus of D'Addario et al. rapidly and efficiently fills tubes of various sizes and dimensions and avoids or minimizes the delays from inadvertent spills and misalignments that typically occur in a rapid tube filling operation. The apparatus is comprised of a rotating disc having a plurality of stations in which filling functions associated with the filling of tubes on a production basis occur. The disc is provided with a plurality holes in which tube filling support means are inserted to retain the tubes and enable simultaneous operations at a plurality of stations. The disc is provided with plastic collars at each hole to accommodate the tube support means for both rotation and secure placement. Work stations are provided in registry with the rotating disc and comprise a means for loading tubes into the tube holders, means for properly registering and determining registration and orientation of the tube for subsequent functions, reject means, cleaning means, filling means, sealing means, trimming means, and tube eject means.

FIG. 1 shows a prior art sealing device 2 marketed by AMTECH which may be used in the tube filling apparatus of the prior art. A filled but unsealed tube 4 is encased by a cylindrical tube support member 8 and moved into position for sealing via an indexing motor 6. An anvil 10 is positioned on one side of the unsealed tube 4 and a horn 12 is positioned on an opposite side of the unsealed tube 4 in an open position. The anvil 10 and horn 12 laterally move from the open position towards the tube 4 into a sealing position so as to pinch the tube end to be sealed against each other. The anvil 10 then remains stationary, and the horn 12 vibrates to emit a burst of ultrasonic energy to effect a seal of the tube end. The ultrasonic sound waves cause the molecules in the tube material to vibrate, drift together and solidify into the desired seal. The anvil 10 and horn 12 then retract away from the tube 4 to the open position after sealing. When the sealing process is complete, a sealing device computer 77 sends a signal to a main computer (not shown) to continue processing and to load the next open tube for sealing.

The molecular action of the ultrasonic sealing process generates heat energy which is dissipated from the inside of the seal out towards the anvil 10 and horn 12. When large tubes are ultrasonically sealed in accordance with this prior art method and apparatus, longer dwell times are required to effect a proper seal. As a result, it has been discovered that more heat is generated and undesirably transmitted back to the anvil 10 and horn 12. The excess heat changes the physical properties of the anvil 10 and horn 12 and causes the sealer to use excessive energy, which leads to an overload condition. Thus, it has been desired to cool the ultrasonic sealer already in use in the prior art tube filling stations in order to negate the effect of excessive heat generated from sealing large tubes.

In the prior art, the anvil 10 is cooled via a heat exchange medium such as externally cooled water which is transported through a number of passageways disposed through its body. This type of cooling may only be implemented on the anvil 10 since it remains fixed during the sealing process and does not vibrate to emit ultrasonic energy to effect the seal. The horn 12, however, cannot be cooled in this manner since the use of such a cooling means undesirably affects its ultrasonic vibration properties.

The simplest way to cool the horn 12 of the sealing device 2 is to intermittently stop or slow down the machine and allow it to cool. This is undesirable since it decreases the productivity from the filling apparatus. Another way to cool the horn 12 is to blow cool air over its surface and convectively cool it. This, however, only imparts minimal heat transfer and has not resulted in desirable cooling effectiveness.

It is thus an object of the present invention to provide an apparatus and method to effectively cool an ultrasonic sealing device which is already in use in an existing tube filling and sealing production line.

It is a further object of the present invention to provide an apparatus and method to effectively cool such an ultrasonic sealing device without slowing down or stopping the tube filling and sealing production line.

It is a further object of the present invention to provide an apparatus and method to effectively cool such an ultrasonic sealing device without adversely affecting the ultrasonic sealing properties of the device.

It is a further object of the present invention to provide an apparatus and method to effectively cool such an ultrasonic sealing device which overcomes the deficiencies of the prior art.

SUMMARY OF THE INVENTION

In accordance with this and other objects, the present invention is a method and apparatus for cooling an ultrasonic sealing device which overcomes the disadvantages of the prior art. When implemented in conjunction with the ultrasonic sealing device of the prior art as described above, the cooling apparatus comprises a heat exchange block located in close proximity to the horn of the ultrasonic sealing device when the horn is in the closed, or sealing, position. A pneumatically controlled piston is operatively associated with the heat exchange block to cause it to contact the horn only when the horn retracts to an open position and to remove the heat exchange block from contact with the horn when the horn advances to the sealing position.

As a result of the apparatus of the present invention, the heat exchange block is in contact with and draws heat from the horn only when the horn is in the open position but not when the horn is in the sealing position. Thus, the ultrasonic sealing properties of the horn are unaffected by the heat exchange process since there is no contact with the heat exchange block during the ultrasonic sealing operation. By contacting the heat exchange block with the horn during the open non-sealing phase of the process, the horn is cooled on at least an intermittent basis.

In order to continually and effectively draw heat from and thus cool the heat exchange block, the heat exchange block may have passageways disposed strategically throughout for effecting transport therethrough of an externally cooled fluid such as water. The cooling apparatus then also comprises means for providing to and from the heat exchange block passageways the externally cooled fluid, typically comprising water supply and drain leads. Thus, the heat exchange block will continually provide a cool surface relative to the ultrasonic sealing device and sink heat away accordingly.

DESCRIPTION OF THE PREFERRED EMBODIMENT

Figure 1:
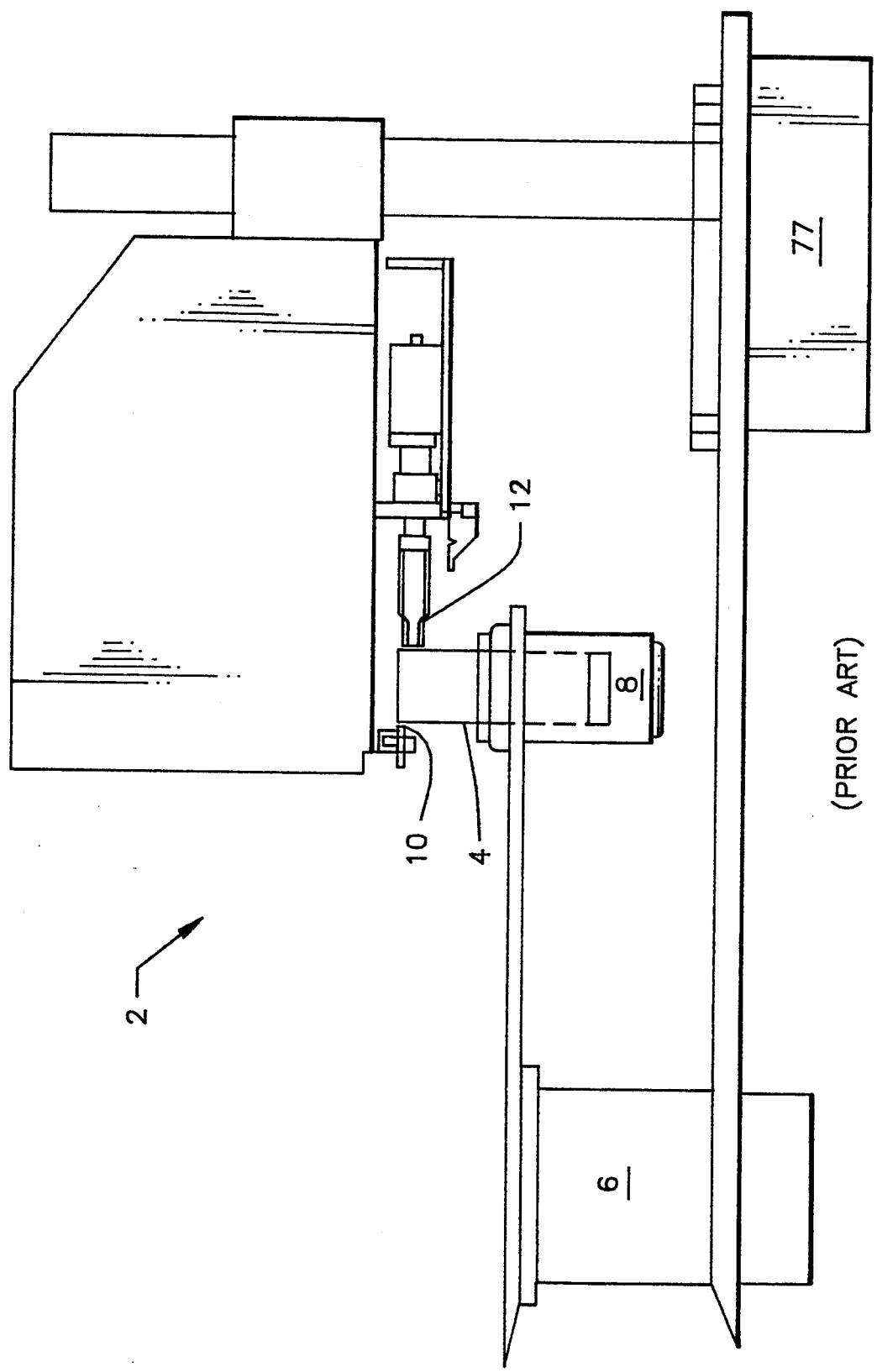
FIG. 1 is a side view of the ultrasonic sealing device of the prior art.
Figure 2B:
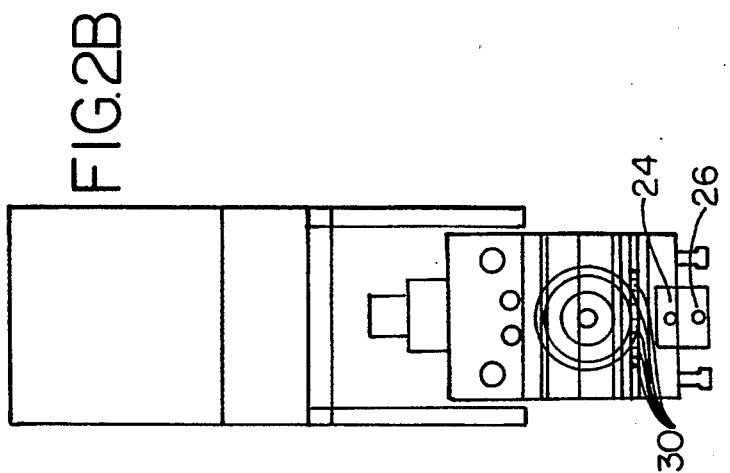
FIGS. 2A, 2B and 2C are a side view, rear view and top view of the ultrasonic sealing device of FIG. 1 modified by the addition of the cooling apparatus of the preferred embodiment of the present invention.
Figure 2C:
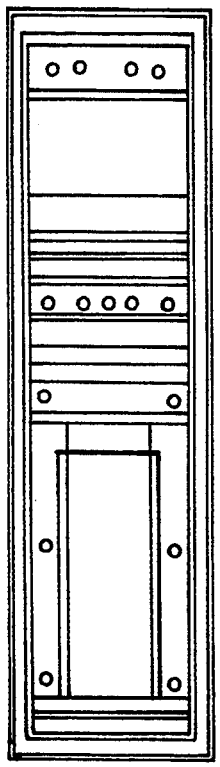
Figure 2A:
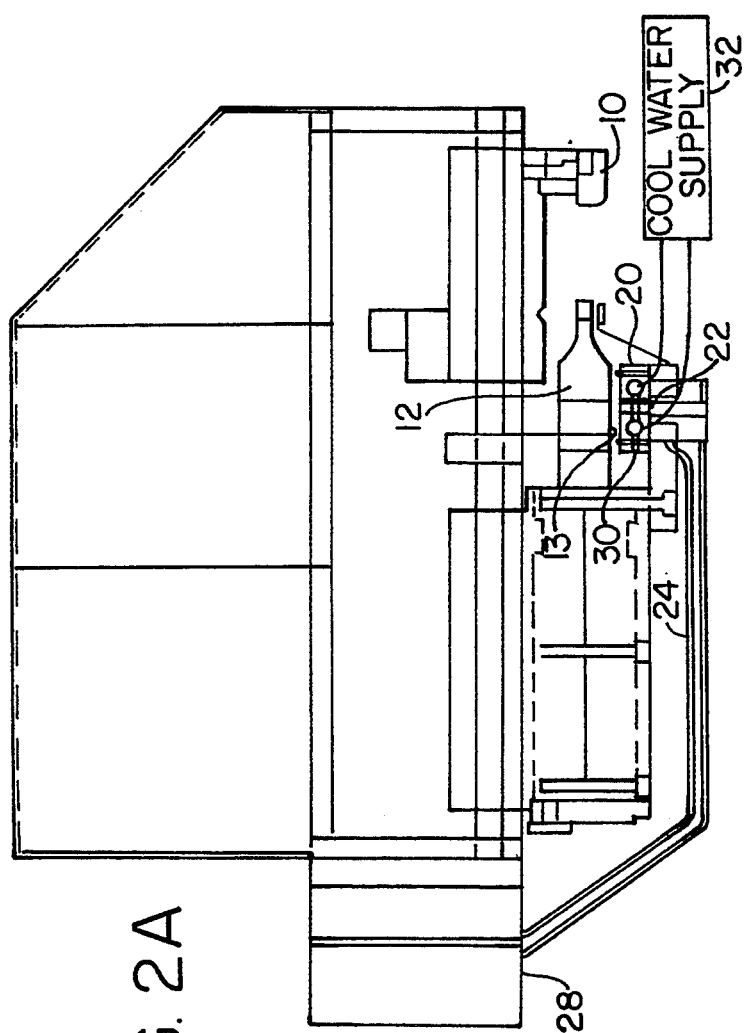
Figure 3A:
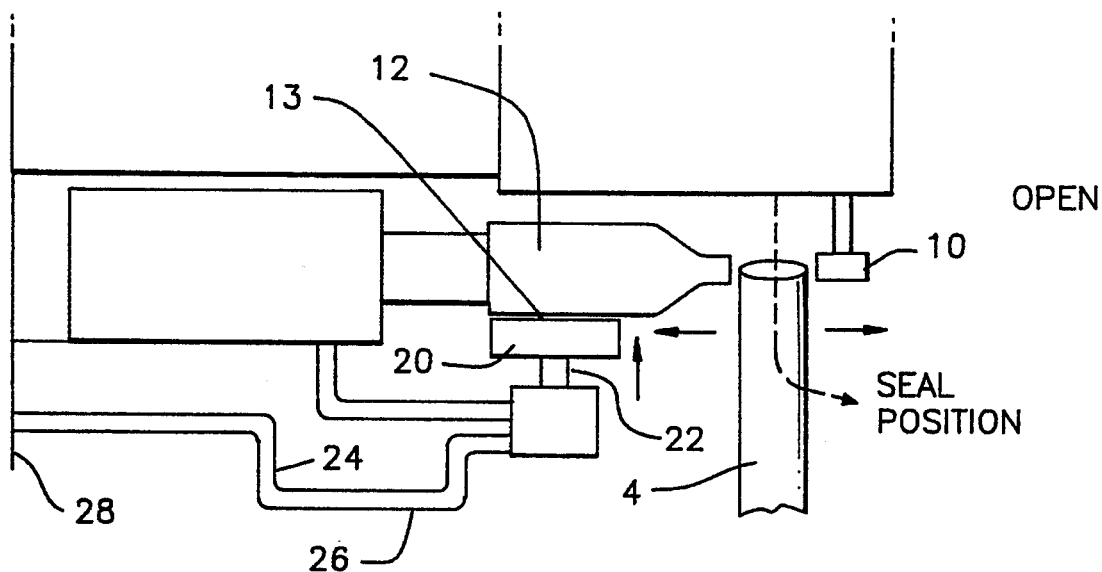
FIG. 3A shows the modified ultrasonic sealer of the present invention in the open heat-sinking position.
Figure 3B:
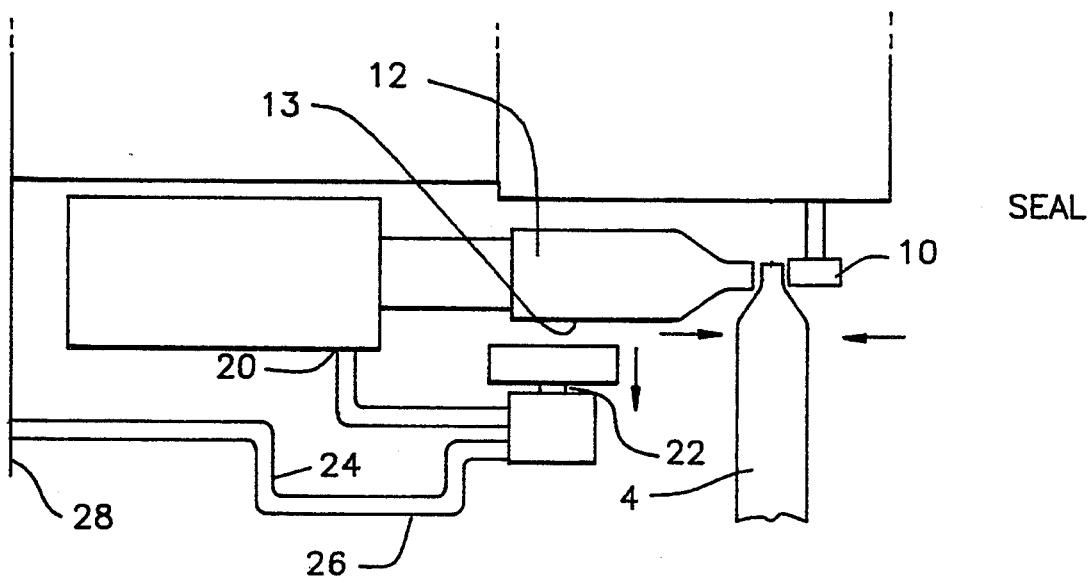
FIG. 3B shows the modified ultrasonic sealer of the present invention in the closed sealing position.

The preferred embodiment of the present invention will now be described with reference to the prior art ultrasonic tube sealing device shown in FIG. 1 and described above. Referring to the figures, a heat exchange block 20, which in the preferred embodiment is aluminum, is located so as to be in substantial contact with an underside 13 of the horn 12 when the anvil 10 and horn 12 are in the open, or retracted, position.

The aluminum block 20 is operatively associated with a pneumatic piston 22. A first air hose 24 and a second air hose 26 are coupled from a pneumatic controller 28 to the piston 22. The first air hose 24 controls the piston 22 so as to effect downwards movement of the aluminum block 20, and the second air hose 26 controls the piston 22 so as to effect upwards movement of the aluminum block 20. The pneumatic air hoses 24, 26 are operatively associated with the pneumatic controller 28 which drives the advancing and retracting (closing and opening) of the anvil 10 and horn 12 towards and away from each other such that the operation of the piston 22 is in synchronization with the lateral movement of the anvil 10 and horn 12.

When the anvil 10 and horn 12 are in the open or retracted position, the piston 22 causes the aluminum block to press against the underside 13 of the horn 12, thus acting as a heat sink and cooling the horn 12. When the pneumatic controller 28, under command of the sealing device computer 77, advances the anvil 10 and horn 12 towards each other so as to pinch therebetween the open end of the tube 4, the piston 22 is caused via the air hose 24 to effect downward movement of the aluminum block 20 away from the horn 12.

After the ultrasonic sealing operation is completed, the pneumatic controller 28 causes the anvil 10 and horn 12 to retract away from each other back to the open position. The controller 28 synchronously causes via the air hose 26 the aluminum block 20 to move upwardly towards the underside 13 of the horn 12 so as to make contact therewith. Any heat generated by the ultrasonic sealing process is drawn from the horn 12 as a result of contact with the aluminum block 20.

This up/down movement of the aluminum block 20 continues in synchronization with the open/close movement of the anvil 10 and horn 12 so as to provide efficient cooling of the horn 12 without affecting its ultrasonic properties during the sealing process itself.

The aluminum block 20 comprises passageways 30 disposed throughout in order to effect transport of an externally cooled fluid and thus draw heat from the block 20 on a continual basis, thus maintaining the heat sink effectiveness of the block 20 in relation to the horn 12. The externally cooled fluid can be supplied by any known means available in the prior art.

The horn 12 does not vibrate at all when it is in the non-sealing retracted position. This is significant since the horn 12 could be damaged if it were to vibrate while in contact with the cooling block 20.

Although the preferred embodiment has been described in relation to an ultrasonic tube sealing device which implements an anvil and a horn, it is understood that the present invention can be implemented with any type of ultrasonic sealer and modified in accordance with the user's needs. For example, if an ultrasonic sealer is used which comprises two horns, each horn can be equipped with similar cooling mechanisms synchronized to their particular sealing operations.

I claim:

1. A method for cooling an ultrasonic sealing device, said ultrasonic tube sealing device comprising an anvil positioned on one side of a tube end to be sealed and a horn positioned on an opposite side of the tube end to be sealed, the anvil and horn being laterally movable from an open position to a sealing position so as to pinch the tube end to be sealed against each other, the horn emitting ultrasonic energy to effect a seal of the tube end, the anvil and horn retracting to an open position after sealing; said method comprising the steps of:
   (a) providing in close proximity to the horn when the anvil and horn are in the sealing position a heat exchange block;
   (b) contacting the horn with said heat exchange block when the anvil and horn retract to the open position; and
   (c) separating said heat exchange block from the horn when the anvil and horn advance to the sealing position;
   whereby said heat exchange block is in contact with and draws heat from the horn only when the anvil and horn are in the open position and the ultrasonic properties of the horn are unaffected by the heat exchange process.

2. The method of claim 1 comprising the further step of:
   (d) cooling said heat exchange block.

3. The method of claim 2 in which said step of cooling said heat exchange block comprises the step of effecting transport of an externally cooled fluid through passageways disposed strategically throughout said heat exchange block.

4. The method of claim 3 in which said contacting and separating steps are implemented by a pneumatically controlled heat exchange piston operatively associated with said heat exchange block.

5. The method of claim 4 in which the anvil and horn are laterally moved between the open position and the sealing position by pneumatic means and said heat exchange piston moves and removes said heat exchange block to and from contact with the horn in synchronization with said pneumatic means.

6. An apparatus for cooling an ultrasonic sealing device, wherein the ultrasonic sealing device comprises an anvil positioned on one side of a tube end to be sealed and a horn positioned on an opposite side of the tube end to be sealed, and wherein the anvil and horn laterally move from an open position to a sealing position so as to pinch the tube end to be sealed against each other, and wherein the horn emits ultrasonic energy to effect a seal of the tube end, and wherein the anvil and horn retract to an open position after sealing, said cooling apparatus comprising:
(a) heat exchange means located in close proximity to the horn when the anvil and horn are in the sealing position;
(b) means for moving said heat exchange means to contact the horn when the anvil and horn retract to the open position; and
(c) means for removing said heat exchange means from contact with the horn when the anvil and horn advance to the sealing position;
whereby said heat exchange means is in contact with and draws heat from the horn only when the anvil and horn are in the open position and the ultrasonic properties of the horn are unaffected by the heat exchange process.

7. The cooling apparatus of claim 6 in which said heat exchange means is an aluminum block.

8. The cooling apparatus of claim 7 further comprising means for cooling said heat exchange block.

9. The cooling apparatus of claim 8 in which said heat exchange block cooling means comprises passageways disposed strategically through said heat exchange block for effecting transport therethrough of an externally cooled fluid.

10. The cooling apparatus of claim 9 further comprising means for providing to and from said heat exchange block passageways an externally cooled fluid.

11. The cooling apparatus of claim 10 in which said means for moving said heat exchange block and said means for removing said heat exchange block comprise a pneumatically controlled heat exchange piston operatively associated with said heat exchange block.

12. The cooling apparatus of claim 11 in which the anvil and horn are laterally moved between the open position and the sealing position by pneumatic means and said heat exchange piston moves and removes said heat exchange block to and from contact with the horn in synchronization with said pneumatic means.

13. In a tube filling apparatus comprising an ultrasonic tube sealing device, wherein the ultrasonic tube sealing device comprises an anvil positioned on one side of a tube end to be sealed and a horn positioned on an opposite side of the tube end to be sealed, and wherein the anvil and horn laterally move via pneumatic means from an open position to a sealing position so as to pinch the tube end to be sealed against each other, and wherein the horn emits ultrasonic energy to effect a seal of the tube end, and wherein the anvil and horn retract to an open position after sealing; an apparatus for cooling the ultrasonic tube sealing device comprising:
(a) a heat exchange block located in close proximity to the horn when the anvil and horn are in the sealing position, said heat exchange block comprising passageways disposed strategically throughout for effecting transport therethrough of an externally cooled fluid;
(b) a pneumatically controlled heat exchange block piston operatively associated with said heat exchange block to cause said heat exchange block to contact the horn when the anvil and horn retract to an open position and to remove said heat exchange block from contact with the horn when the anvil and horn advance to a sealing position; and
(c) means for providing to and from said heat exchange block passageways an externally cooled fluid;
whereby said heat exchange block is in contact with and draws heat from the horn only when the anvil and horn are in the open position and the ultrasonic properties of the horn are unaffected by the heat exchange process.

14. In a tube filling apparatus comprising an ultrasonic tube sealing device, wherein the ultrasonic tube sealing device comprises an anvil positioned on one side of a tube end to be sealed and a horn positioned on an opposite side of the tube end to be sealed, and wherein the anvil and horn laterally move via pneumatic means from an open position to a sealing position so as to pinch the tube end to be sealed against each other, and wherein the horn and emits ultrasonic energy to effect a seal of the tube end, and wherein the anvil and horn retract to an open position after sealing; a method for cooling the ultrasonic tube sealing device comprising:
(a) providing a heat exchange block located in close proximity to the horn when the anvil and horn are in the sealing position, wherein said heat exchange block comprises passageways disposed strategically throughout for effecting transport therethrough of an externally cooled fluid;
(b) pneumatically causing said heat exchange block to contact the horn when the anvil and horn retract to an open position;
(c) pneumatically removing said heat exchange block from contact with the horn when the anvil and horn advance to a sealing position; and
(d) providing to and from said heat exchange block passageways an externally cooled fluid;
whereby said heat exchange block is in contact with and draws heat from the horn only when the anvil and horn are in the open position and the ultrasonic properties of the horn are unaffected by the heat exchange process.

* * * * *